United States Patent
Choo et al.

(10) Patent No.: US 6,822,826 B2
(45) Date of Patent: Nov. 23, 2004

(54) DISC FIXING APPARATUS AND ASSOCIATED METHOD FIXING A DISC AND MOTOR IN BALANCED ROTATION

(75) Inventors: Victor Chi Siang Choo, Singapore (SG); Poh Lye Lim, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 108 days.

(21) Appl. No.: 10/147,134

(22) Filed: May 15, 2002

(65) Prior Publication Data

US 2003/0112552 A1 Jun. 19, 2003

Related U.S. Application Data

(60) Provisional application No. 60/341,323, filed on Dec. 13, 2001.

(51) Int. Cl.⁷ ...................... G11B 17/022; G11B 17/038
(52) U.S. Cl. .................... 360/99.12; 360/98.08
(58) Field of Search .......................... 360/99.12, 98.08, 360/99.05, 99.08

(56) References Cited

U.S. PATENT DOCUMENTS

| | | | |
|---|---|---|---|
| 4,561,035 A | | 12/1985 | McDorman et al. |
| 5,043,973 A | | 8/1991 | Ocheltree et al. |
| 5,130,870 A | * | 7/1992 | Jabbari .................... 360/99.08 |
| 5,243,481 A | | 9/1993 | Dunckley et al. |
| 5,392,178 A | | 2/1995 | Nishio et al. |
| 5,517,374 A | | 5/1996 | Katakura et al. |
| 5,517,376 A | * | 5/1996 | Green .................... 360/98.08 |
| 5,528,434 A | * | 6/1996 | Bronshvatch et al. .... 360/98.08 |
| 5,555,144 A | | 9/1996 | Wood et al. |
| 5,615,067 A | * | 3/1997 | Jabbari et al. ........... 360/98.08 |
| 5,724,208 A | | 3/1998 | Yahata |
| 5,744,882 A | | 4/1998 | Teshima et al. |
| 5,822,151 A | * | 10/1998 | Albrecht et al. ......... 360/98.08 |
| 5,875,171 A | | 2/1999 | Albrecht et al. |
| 5,886,852 A | | 3/1999 | Kikuchi et al. |
| 6,288,867 B1 | * | 9/2001 | Jierapipatanakul et al. ...... 360/98.08 |
| 6,501,617 B1 | * | 12/2002 | Harada et al. ........... 360/99.08 |
| 2001/0043431 A1 | * | 11/2001 | Yoshida et al. .......... 360/98.08 |
| 2002/0024762 A1 | * | 2/2002 | Renken .................... 360/99.12 |
| 2002/0067569 A1 | * | 6/2002 | Choo et al. .............. 360/98.08 |
| 2002/0071206 A1 | * | 6/2002 | Choo et al. .............. 360/99.12 |

FOREIGN PATENT DOCUMENTS

| | | | | |
|---|---|---|---|---|
| JP | 03290890 A | * | 12/1991 | ........... G11B/25/04 |
| JP | 11134840 A | * | 5/1999 | ........... G11B/25/04 |
| JP | 2001291301 A | * | 10/2001 | ......... G11B/17/038 |

\* cited by examiner

Primary Examiner—William J. Klimowicz
(74) Attorney, Agent, or Firm—Jennifer M. Buenzow

(57) ABSTRACT

A disc fixing apparatus and associated methodology for fixing a data storage disc in rotation with the hub of a motor that is rotatable around a motor axis of rotation. The disc fixing apparatus comprises a clamp engaging the hub and comprising a reference surface associated with the clamp axis of rotation. A fastener comprising a registration feature cooperates with the reference surface, registering the clamp with the fastener. The fastener is attached to the motor hub fixing the disc and hub in rotation and registering the clamp to the motor axis of rotation. An associated method is provided for fixing a disc in balanced rotation with a rotatable hub of a motor around a motor axis of rotation. The method comprises providing the clamp member comprising the reference surface associated with the clamp axis of rotation; registering the clamp member with the longitudinal axis of the fastener; aligning the fastener and clamp together with the hub; and attaching the fastener to the hub so as to register the clamp member with the motor axis of rotation.

27 Claims, 6 Drawing Sheets

DISC FIXING APPARATUS AND ASSOCIATED METHOD FIXING A DISC AND MOTOR IN BALANCED ROTATION

CROSS REFERENCE TO RELATED APPLICATIONS

This application claims the benefit of U.S. Provisional Application No. 60/341,323, file date Dec. 13, 2001.

FIELD OF THE INVENTION

This invention relates generally to the field of data storage devices, and more particularly but not by way of limitation to an apparatus and associated method for fixing a data storage disc in balanced rotation with a drive motor.

BACKGROUND OF THE INVENTION

Modern data storage devices such as disc drives are commonly used in a multitude of computer environments to store large amounts of data in a form that is readily available to a user. Generally, a disc drive has a disc stack assembly with one or more data storage discs that are rotated by a motor at high speeds. A clamp is used to fix the discs in rotation with the motor. Each disc has a data storage surface divided into a series of generally concentric data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance away from the data storage surface as the data transfer member flies upon an air bearing generated by air currents caused by the spinning discs.

A continuing trend in the industry is toward ever-increasing the data storage capacity and the processing speed while maintaining or reducing the physical size of the disc drive. Consequently, the data transfer member and the discs are continually being miniaturized, data storage densities are continually being increased, data storage disc speed is continually being increased, and data transfer member fly heights are continually being decreased. One result is an overall increased sensitivity to vibration.

One source of vibration comes from an out-of-balance condition of the disc stack assembly. This can cause positioning errors making the transfer of data from and to the disc unreliable. If the vibration induces too much displacement to the disc or the data transfer member then head crashes can occur, likely causing damage to the data transfer member rendering the data storage device unusable.

One balancing solution known in the art is to bias alternating discs in opposite directions against the centrally supporting motor hub so as to distribute the total disc mass substantially equally around the motor axis of rotation. Although used primarily for multi-disc stacks, this solution has also been suggested in single-disc stacks by biasing a spacer member and the disc. A disadvantage is the additional product cost of the spacer and the process complexity associated with the biasing procedures.

Another group of solutions can be categorized generally as those that add or remove an amount of mass to/from the disc stack to compensate for an observed unbalanced condition from balance testing. In some cases the compensation occurs after the clamp has been attached, such as by attaching a clip or an epoxy material to add balancing weight. Alternatively, the disc stack can be balance tested without the clamp and eccentric spacers can be added to provide the balance weight as needed.

In all these solutions, however, there remains a need for improving the manner of positioning and attaching the clamp in order to preserve the observed balance conditions during balance testing. The imbalance caused by any eccentricity of the clamp relative to the axis of rotation could be assumed negligible in the recent past. However, modern demands for reduced vibration thresholds make the clamp placement a significant factor. Also, high speed automated assembly methods used today demand robust methodologies for attaching the clamp so as to be registered with the axis of rotation.

In some approaches the clamp has a central opening that receivingly engages the outer diameter of the motor hub. If the central opening is sized in a closely-fitting mating relationship with the hub then the clamp can be precisely located. However, any scraping action of the clamp against the hub can result in harmful particulates that interfere with effective disc drive operation. Contrarily, if the central opening is sized for clearance with the hub then the clamp must be precisely positioned before attachment.

Other approaches recognize the benefits of attaching the clamp with a single fastener attached to the rotating hub. These approaches depend on precise placement of the clamp to the hub, and require an oversized clearance aperture through which the fastener is passed and joined to the hub in attaching the clamp.

It has been determined that an improved single-screw disc fixing apparatus is possible wherein the clamp member is provided with a reference surface associated with the clamp axis of rotation, and a fastener member is provided with a registration surface that is matingly engageable with the reference surface. Accordingly, the fastener member can be used to register the clamp relative to a longitudinal axis of the fastener. The fastener can then be attached to the hub so as to register the clamp to the motor axis of rotation. It is to these improvements and others as exemplified by the description and appended claims that embodiments of the present invention are directed.

SUMMARY OF THE INVENTION

Embodiments of the present invention are directed to a disc fixing apparatus for fixing a data storage disc in rotation with the hub of a motor that is rotatable around a motor axis of rotation in a data storage device. The disc fixing apparatus comprises a clamp engageable with the hub comprising a reference surface associated with the clamp axis of rotation. The disc fixing apparatus further comprises a fastener comprising a registration feature cooperable with the reference surface. The fastener is attachable to the motor hub fixing the disc and hub in rotation and registering the clamp to the motor axis of rotation.

In one embodiment of the apparatus the clamp is adapted for coaxial registration to the longitudinal axis of the fastener, and in turn, is adapted for coaxial registration to the motor axis of rotation. The clamp can comprise an annular contact surface pressingly engageable against the disc and concentric with the clamp axis of rotation.

Embodiments of the apparatus contemplate the reference surface defining an opening receivingly engageable with the registration feature in a closely fitting relationship, such as a frictional-fitting relationship so as to maintain the clamp registration with the fastener.

Embodiments of the apparatus further contemplate the registration feature comprising a surface disposed parallel to the fastener longitudinal axis, such as a cylindrical registration feature for use with a reference surface defining a circular opening. The reference surface can be characteristically arcuate and thereby receivingly engageable with the registration feature in a point contact relationship. Furthermore, the registration feature can terminate in an arcuate surface operably engageable with the reference surface in a mating relationship.

Embodiments of the apparatus further contemplate a rough alignment feature comprising an opening defined by the clamp receivingly engageable with a removable locating member that is passable through the clamp and engageable with the hub to fix the clamp and hub in rotation.

Embodiments of the apparatus further contemplate a balancing weight added to the clamp or a balancing weight removed from the clamp, such as a relief notch, characteristically positioned and sized to operably compensate for rotational imbalance.

In another aspect of the embodiments of the present invention a disc stack assembly is provided comprising a motor comprising a hub rotatable around a motor axis of rotation with a disc disposed around the hub. A disc fixing apparatus is provided comprising the clamp reference surface and fastener registration feature fixing the disc and hub in rotation and registering the clamp with the motor axis of rotation.

In yet another aspect of the embodiments of the present invention a method is provided for fixing a disc in balanced rotation with a rotatable hub of a motor around a motor axis of rotation. The method comprises: providing a clamp member comprising a reference surface associated with a clamp axis of rotation; registering the clamp member with a longitudinal axis of a fastener; aligning the fastener and clamp together with the hub; and attaching the fastener to the hub so as to register the clamp member with the motor axis of rotation.

These and various other features as well as advantages which characterize the present invention will be apparent upon reading of the following detailed description and review of the associated drawings.

BRIEF DESCRIPTION OF THE DRAWINGS

FIG. 6 is an enlarged detail of a portion of the disc clamp assembly of FIG. 2 illustrating an arcuate reference surface matingly engaging the registration feature.

DETAILED DESCRIPTION

Figure 1:
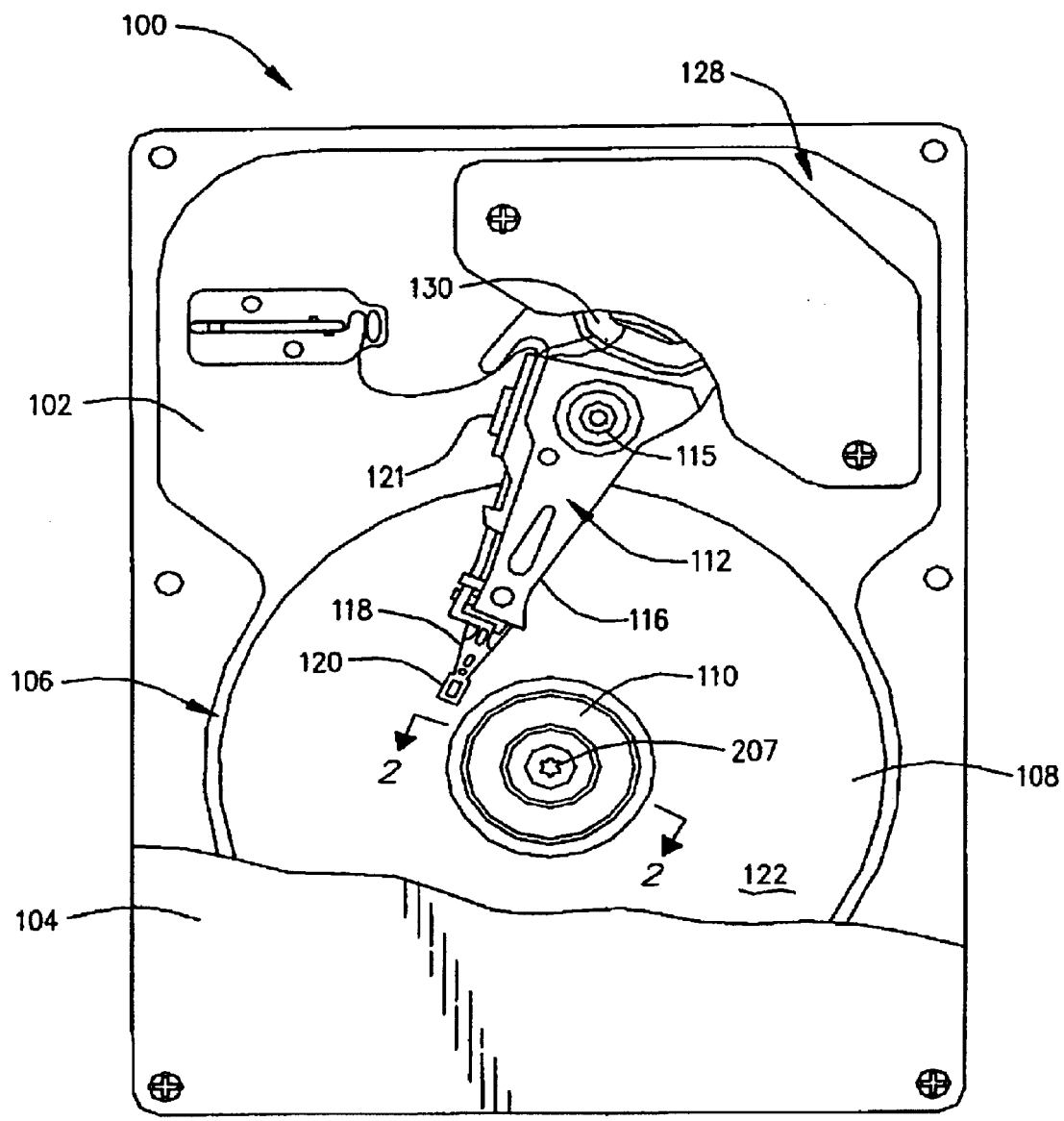
FIG. 1 is a diagrammatic plan view of a data storage device constructed in accordance with an embodiment of the present invention.

Referring to the drawings in general, and more particularly to FIG. 1, shown therein is a plan representation of a data storage disc drive 100 constructed in accordance with an embodiment of the present invention. The disc drive 100 includes a base 102 to which various disc drive components are mounted, and a cover 104 (partially cut-away) which together with the base 102 and a perimeter gasket form an enclosure providing a sealed internal environment for the disc drive 100. Numerous details of general disc drive 100 construction are not included in the following description because they are well known to a skilled artisan and are unnecessary for an understanding of the present invention.

Mounted to the base 102 is a disc stack assembly 106 comprising one or more discs 108 stacked and secured to a motor (shown below) by a clamp ring 110 for fixed rotation. Where a plurality of discs 108 is stacked to form a multi-disc stack assembly, adjacent discs 108 are typically separated by a disc spacer (not shown). An actuator 112 pivots around a pivot bearing 115 in a plane parallel to the discs 108. The actuator 112 has actuator arms 116 (only one shown in FIG. 1) supporting load arms 118 in travel across the discs 108 as the actuator arms 116 move adjacent the discs 108. The load arms 118 (or "flexures") are flex members that support data transfer members, such as read/write heads 120 ("heads"), with each of the heads 120 operably interfacing a respective disc 108 in a data reading and writing relationship. This relationship is maintained by a slider (not shown) having an aerodynamic surface which operably supports the head 120 on an air bearing sustained by air currents generated by the spinning discs 108. Data read and write signals are transmitted from the head 120 to a preamplifier 121 by electrical traces (not shown) extending along the actuator 112.

Each of the discs 108 has a data storage region comprising a data storage surface 122 divided into concentric circular data tracks (not shown). Each of the heads 120 are positioned adjacent a respective desired data track to read data from or write data to the data track. The data storage surface 122 can be bounded inwardly by a circular landing zone where the heads 120 can come to rest against the respective discs 108 at times when the discs 108 are not spinning. Alternatively, the landing zone can be located elsewhere.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up interacting with the magnetic circuit and causing the actuator coil 130 to move. As the actuator coil 130 moves, the actuator 112 pivots around the pivot bearing 115, causing the heads 120 to travel across the discs 108.

Figure 2:
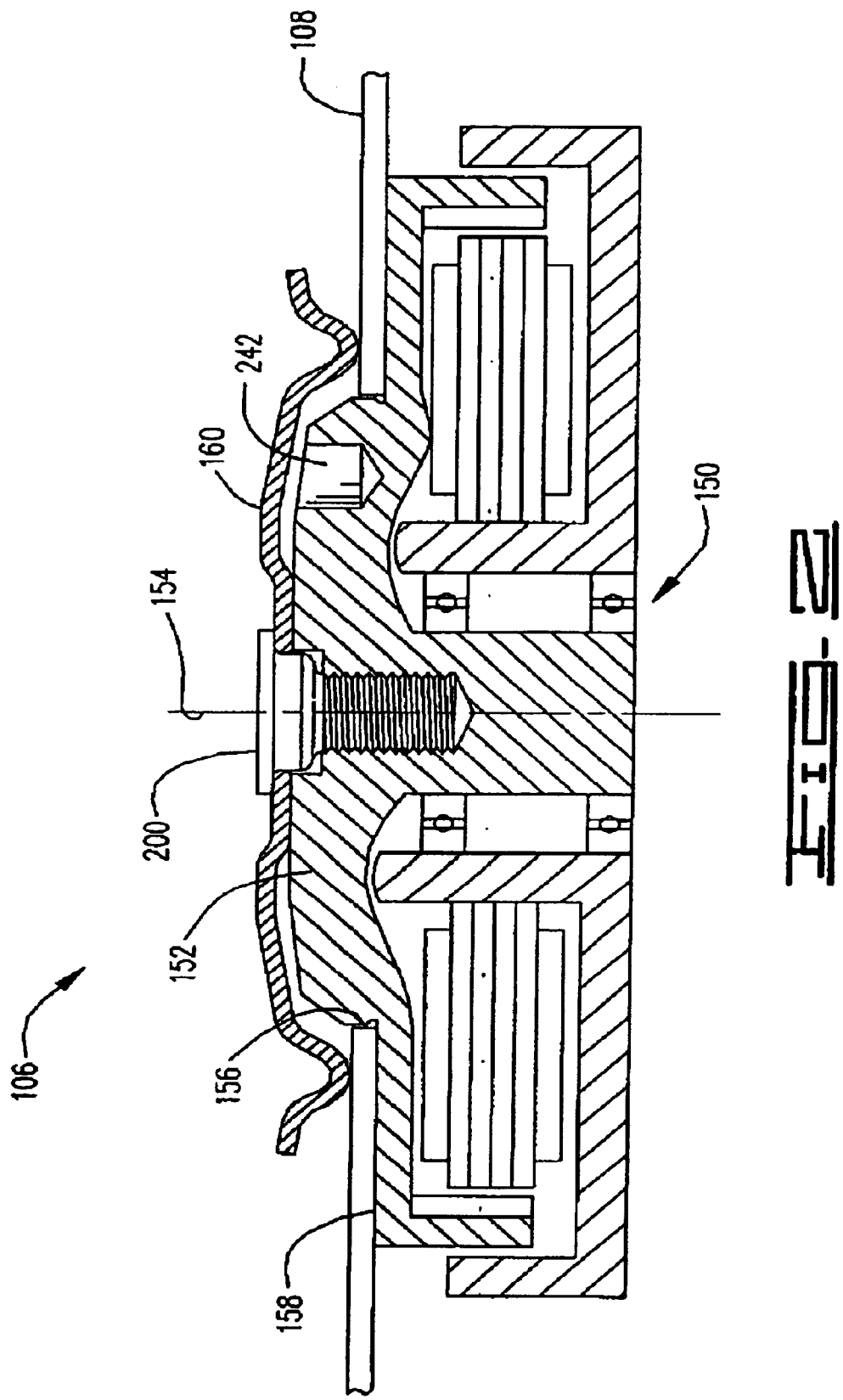
FIG. 2 is a cross-sectional view of the disc stack assembly taken generally along the section line 2—2 of FIG. 1.

The disc stack assembly 106 spins the discs 108 at a high speed as the head 120 reads data from and writes data to the data storage surface 122. FIG. 2 is a cross-sectional view of an illustrative disc stack assembly 106 comprising one disc 108. The disc stack assembly 106 also comprises a motor 150 having a hub 152 operably rotatable around a longitudinal axis 154 (motor axis of rotation). The disc 108 has a central aperture 156 through which a portion of the hub 152 passes and the disc 108 is supported upon a planar surface 158 defined by another portion of the hub 152.

Figure 3:
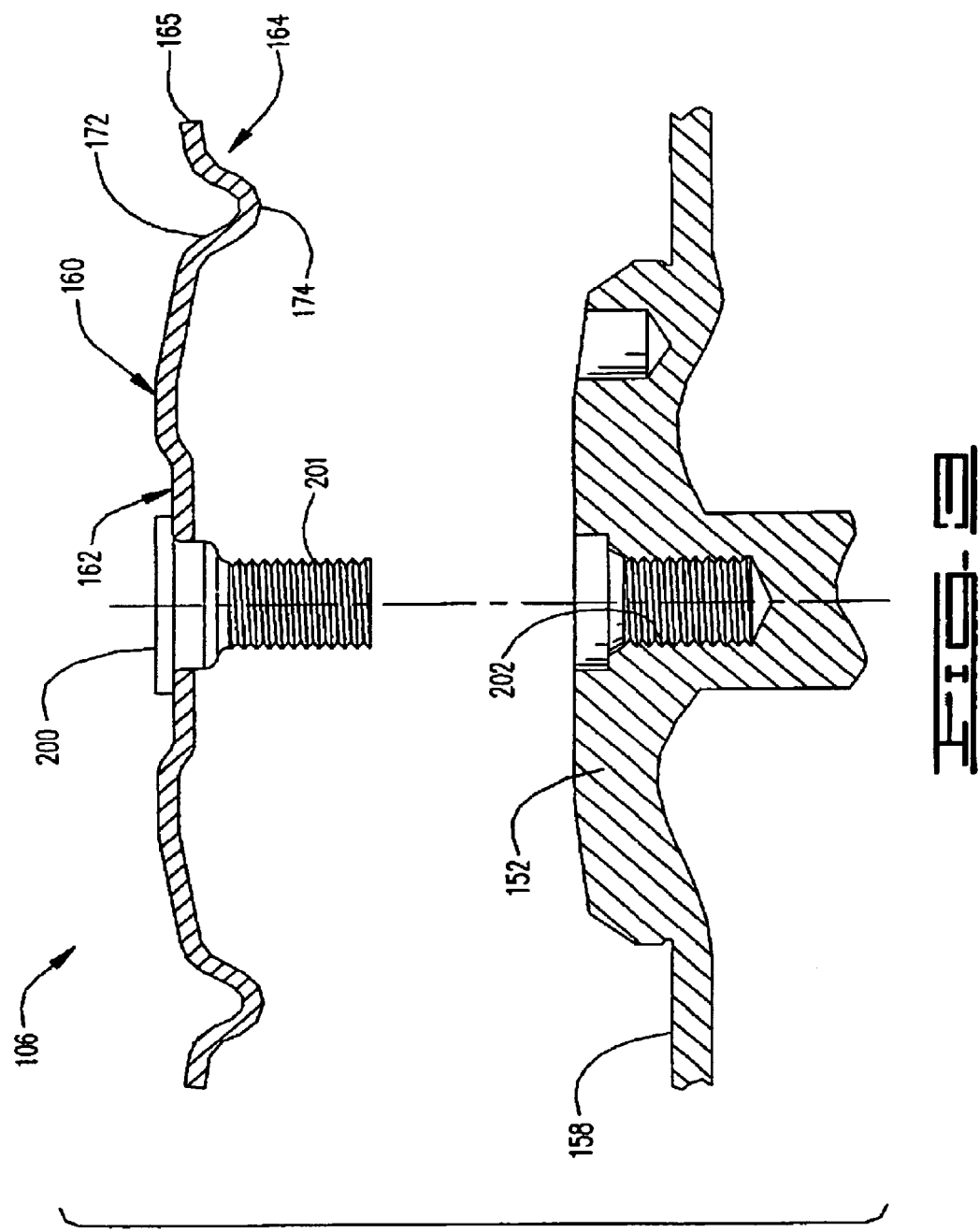
FIG. 3 is a partially exploded elevational view of a portion of the disc stack assembly of FIG. 2.

FIGS. 2 and 3 illustrate a clamp 160 in an installed and uninstalled mode, respectively. The clamp 160 generally comprises a central support portion 162 and a contact portion 164 depending from the support portion 162. The contact portion 164 is operably engageable against the disc 108 in the installed mode, fixing the disc 108 and hub 152 in rotation. It will be noted that the clamp 160 is a spring member such that in the uninstalled mode the contacting portion 164 forms a generally conical cross-section depending from a substantially planar central portion 162. In the installed mode longitudinal attachment forces applied to the support portion 162 deflect the contact portion 164 relative to the support portion 162 to exert the clamping force against the disc 108.

Figure 4:
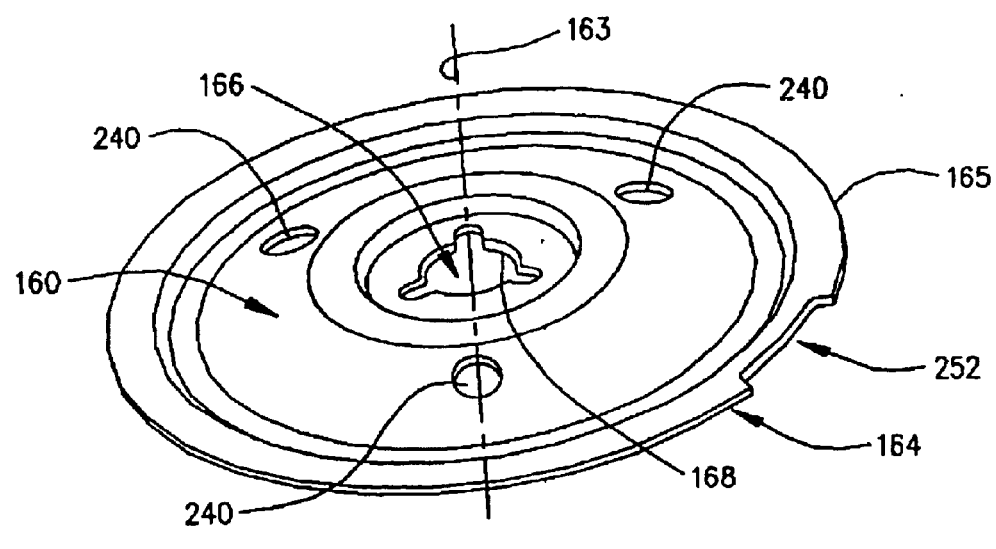
FIG. 4 is an isometric view of the clamp of FIG. 3.

FIG. 4 is an isometric view of the clamp 160 of FIGS. 3 and 4, illustrating a characteristically disc-shaped planar member extending radially from a central axis 163 to a distal edge 165. An aperture, such as an illustrative circular aperture 166, is defined by a reference surface 168 and is associated with the clamp axis of rotation relative to the central axis 163. For example, in one embodiment illustrated by FIG. 4 the reference surface 168 defines an opening 166 disposed coaxially with the central axis 163, such that the opening 166 is centered around the central axis 163. In this illustrative embodiment the opening 166 can be used to register the clamp 160 for coaxial rotation with the central axis 163. Alternatively, the opening 166 can be offset relative to the central axis 163 so as to register the clamp 160 for eccentric rotation relative to the central axis 163.

It will be noted that the opening 166 is similarly associated with the clamp mass center (not separately designated), and hence likewise associated with the clamp rotational inertia. For example, the opening 166 can in one embodiment be nonconcentric with the central axis 163 to provide an eccentric balancing force. This can be advantageous where the disc 108 is biased relative to the motor axis of rotation.

The opening 166 is likewise associated with the positioning of the contact portion 164 of the clamp 160. For example, the clamp 160 in the embodiment of FIG. 3 comprises a contact portion 164 comprising a substantially orthogonal flange 172 adjacent the distal edge 165. The flange 172 defines an arcuate contact surface 174 operably engageable against the disc 108 in a single point contacting relationship. In one embodiment, the flange 172 extends annularly and concentric with the opening 166 (FIG. 4) so that the desired amount of clamp 160 eccentricity, if any, determines the location of the clamp 160 interface with the disc 108. In another embodiment the flange 172 extends concentrically with the central axis 163.

Returning now to FIGS. 2 and 3, the disc stack assembly 106 further comprises a fastener 200 for joining the clamp 160 to the hub 152. In one embodiment the fastener 200 comprises a spiral-threaded portion 201 and the hub 152 comprises a spiral threaded bore 202 receivingly engaging the fastener 200 in a threading engagement.

Figure 5:
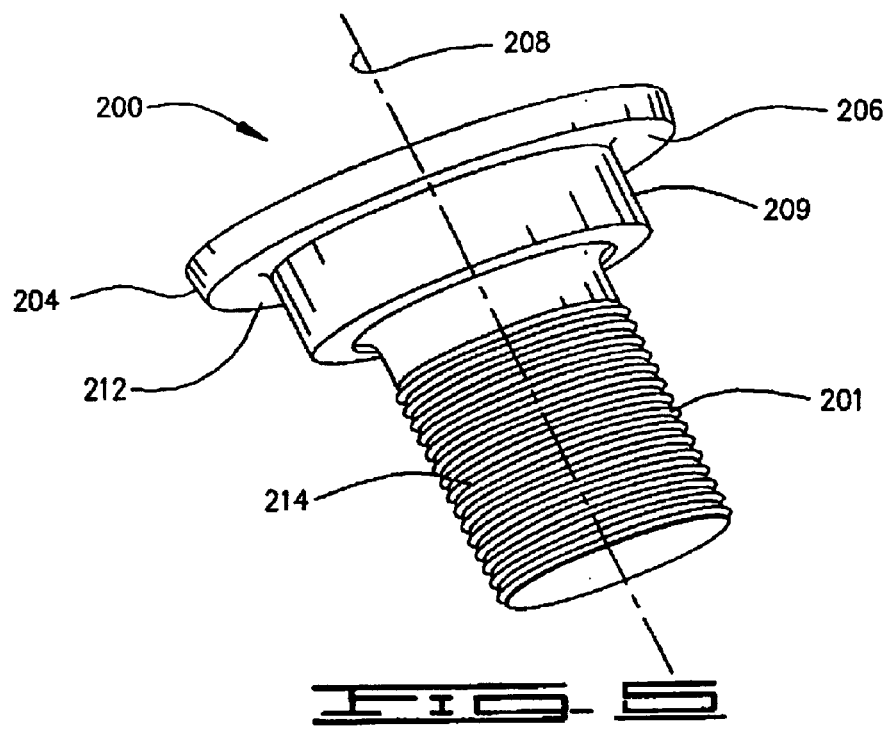
FIG. 5 is an isometric view of the fastener of FIG. 3.
Figure 5:
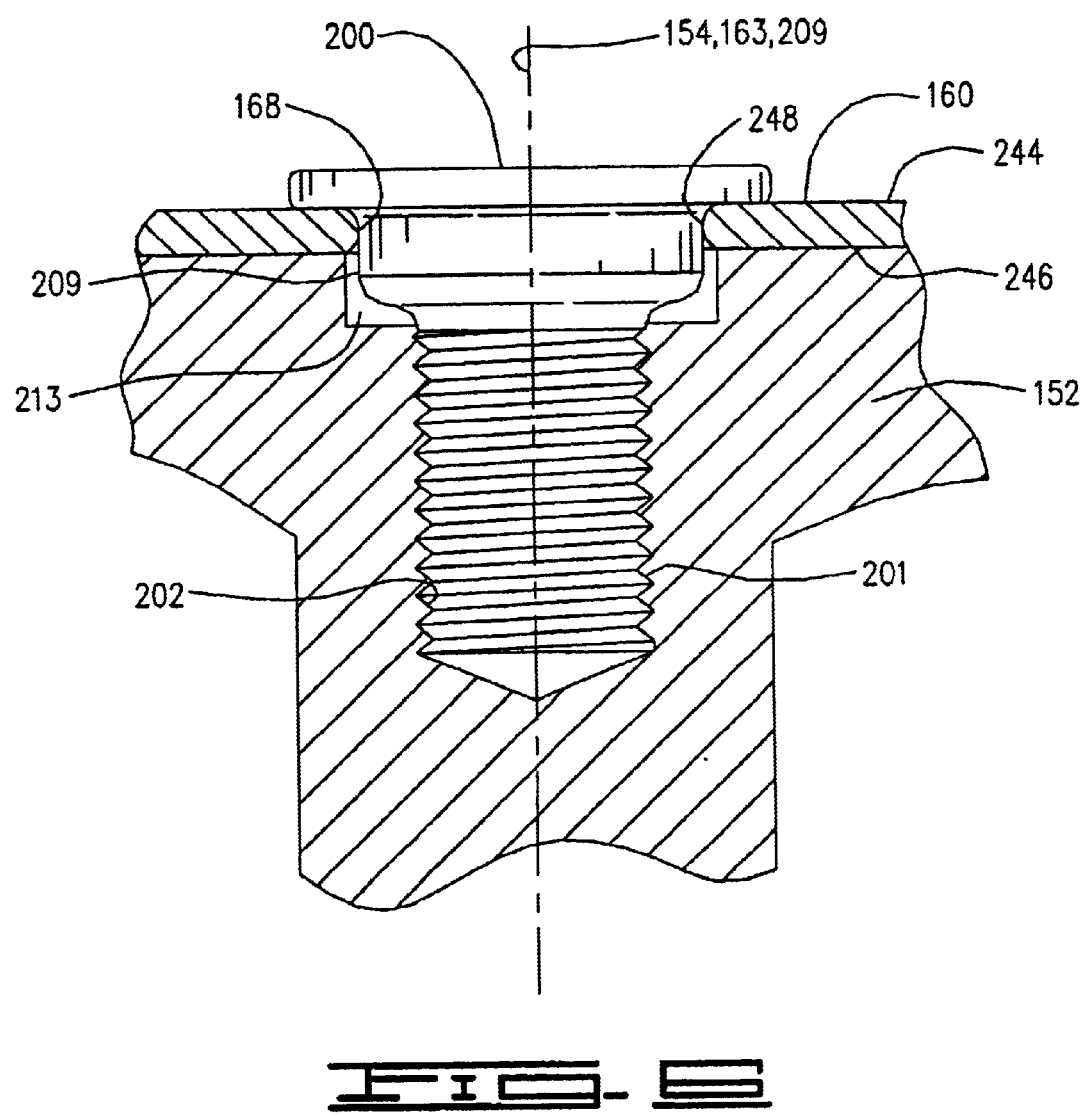

FIG. 5 is an isometric view of an illustrative fastener 200 constructed in accordance with an embodiment of the present invention. The fastener 200 has a head portion 204 defining a diameter greater than the central aperture 166 diameter (FIG. 4), such that a bearing surface 206 operably pressingly engages against the clamp 160. A tool receiving feature, such as a Torx® brand characteristic opening 207 (FIG. 1) is defined in the head 204 in order to affect engagement of the fastener 200 (such as turning a threaded fastener).

The fastener 200 further comprises a registration feature that is engageable with the reference surface 168 (FIG. 4), registering the clamp 160 relative to a longitudinal axis 208 of the fastener 200. For example, the illustrative fastener 200 of FIG. 5 comprises a registration feature 209 having a surface disposed substantially parallel to the longitudinal axis 208, and further characterized as a cylindrical surface receivingly engageable within the opening 166 in a closely-fitting relationship.

FIG. 6 is an enlarged detail of the fastener 200 operably engaged with the hub 152, thereby pressingly engaging the clamp 160 against the hub 152. It will be noted that due to the closely-fitting relationship of the clamp 160 and the fastener 200, the clamp is registered to the hub 152 by the attachment of the fastener 200 to the hub 152. In other words, there is substantially no clearance for the clamp 160 to move laterally relative to the attached position of the fastener 200.

Preferably, the registration feature 209 is engageable with the reference surface 168 in an interference-fitting relationship, establishing a frictional force maintaining the clamp 160 registration with the fastener 200 before attachment to the hub 152. This arrangement lends itself well to an automated assembly procedure wherein the clamp 160 can be registered to the fastener 200 at a subassembly station away from the data storage discs. This prevents any particulates resulting from the interference-fitting relationship from falling on or near the data storage surface. As illustrated in FIG. 6, any particulates resulting from turning the fastener 200 during attachment will fall harmlessly into a clearance gap 213 within the threaded bore 202.

Where an interference fit exists between the opening 166 and the registration feature 209, it can be advantageous to support the clamp 160 so as to prevent rotation when the fastener 200 is turned during threading engagement with the hub 152. In one illustrative embodiment one or more apertures 240 (FIG. 4) can be defined by the clamp 160 that are receivingly engageable with a removable locating member, such as a location pin (not shown). The locating pin can be passed through the clamp 160 and have a distal end engageable with an aperture 242 (FIG. 2) in the hub 152. The size of the locating pin relative to the apertures 240, 242 can be selected in order to provide a desired quality of rough alignment of the clamp 160 with the hub 152 prior to attachment of the fastener 200.

It will be noted in FIG. 6 the clamp 160 comprises opposing planar faces 244, 246 with the reference surface 168 connecting the faces 244, 246. Preferably, where an interference fit is desirable, the reference surface 168 is characteristically arcuate and thereby receivingly engageable with the registration feature 209 in a point contact relationship. This minimizes the amount of particulates that might be created as the fastener 200 is attached.

Alternatively, where a slip fit between the reference surface 168 and the registration feature 209 is desirable, then preferably the registration feature 209 terminates in an arcuate surface 248 operably engageable with the reference surface 168 in a mating relationship. This facilitates centrally disposing the fastener 200 within the opening 166.

The disc fixing apparatus described hereinabove produces a disc stack assembly with significantly improved rotational balance performance characteristics. In one preferred embodiment, it is desirable to coaxially align the clamp 160 with the hub 152. This is likely the case when the disc 108 is centered around the hub 152. Accordingly, the opening 166 would be centrally positioned in the clamp 160, such that the clamp axis of rotation is coaxial with the clamp central axis 163. The fastener 200 would pressingly engage the reference surface 168 within the opening 166 in order to register the clamp 160 to the fastener longitudinal axis 208. The fastener 200 would then be attached to the hub 152, registering the clamp axis of rotation (coaxial with 163) with the motor axis of rotation 154. Accordingly, as shown in FIG. 6, the motor axis of rotation 154, clamp axis of rotation 163, and fastener longitudinal axis 208 are coaxially aligned.

Returning to FIG. 4, adjustments to the clamp mass distribution can be made to compensate for rotational imbalance. For example, balancing weight can be added to the clamp (not shown), or balancing weight can be removed from the clamp such as by defining a relief notch 252 in the distal edge 165.

The embodiments of the present invention contemplate a disc drive comprising a base, a motor supported by the base comprising a hub operably rotatable around a longitudinal axis, a disc disposed around the hub, and means for fixing the disc in rotation with the hub by applying a longitudinal clamping force acting on the disc. For purposes of the present description, as explicitly and implicitly described in the illustrative embodiments hereinabove and illustrated in the exemplary embodiments set forth in the drawings, the means for fixing contemplates other equivalent embodiments wherein the clamp comprises a reference surface associated with positioning the clamp axis of rotation. Furthermore, the means for fixing contemplates embodiments wherein a fastener comprising a registration feature is engageable with the reference surface, and the fastener is engageable with the hub so as to register the clamp as desired relative to the hub axis of rotation. Accordingly, the means for fixing expressly does not contemplate prior art approaches involving a clamp with a clearance aperture receiving a fastener member, wherein the clearance permits the clamp to be positioned independently of the fastener position.

Figure 7:
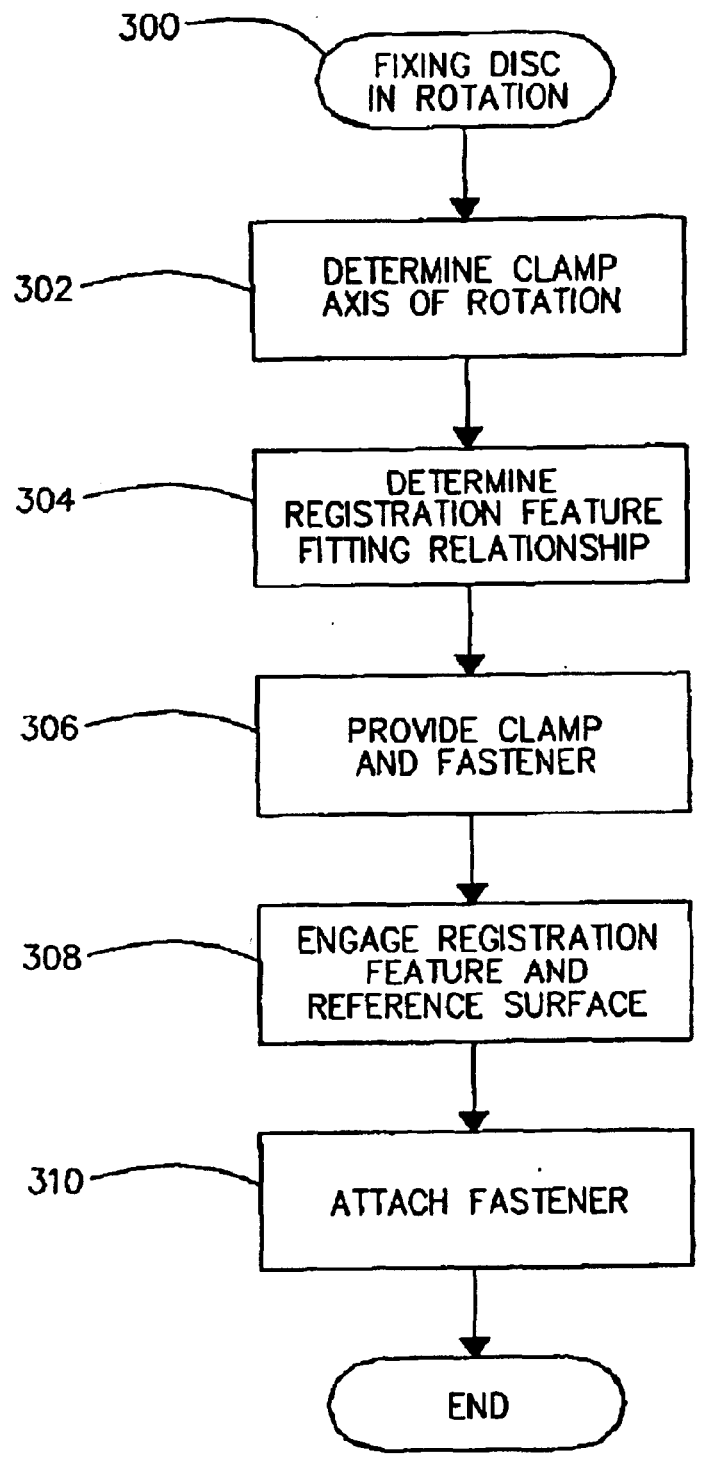
FIG. 7 is a block diagram of a method of fixing the disc in rotation with the motor in accordance with an embodiment of the present invention.

FIG. 7 illustrates a method 300 associated with the embodiments of the apparatus described hereinabove for fixing a disc in rotation with a motor. First, the desired clamp rotation axis relative to the motor rotation axis is determined in block 302. For example, where the motor supports a centrally disposed disc then it is likely preferable to center the clamp around the motor axis of rotation; accordingly, the opening in the clamp would be centrally located. Alternatively, where the disc is biased, it can be advantageous to offset the clamp in the opposite direction for balancing; accordingly, the opening in the clamp would be offset.

The fitting relationship of the registration feature and the clamp opening is determined in block 304. For example, in one embodiment an interference fit is advantageous, providing a retention force on the clamp so that the subassembly can be moved together without disrupting the clamp registration to the fastener. Alternatively, a slip fit can be advantageous to minimize particulates from the scraping action of an interference fit.

With the location of the opening determined in block 302, and the size of the opening and the registration feature determined in block 304, the clamp and the fastener can then be provided in block 306. The registration feature is engaged with the reference surface in block 308, so as to register the clamp to the fastener. The fastener is then attached to the motor in block 310 in order to register the clamp to the motor.

In summary, the embodiments of the present invention contemplate a disc fixing apparatus for fixing a data storage disc (such as 108) in rotation with the hub (such as 152) of a motor (such as 150) around a motor axis of rotation (such as 154) in a data storage device (such as 100). The disc fixing apparatus comprises a clamp (such as 160) that is engageable with the hub and comprises a reference surface (such as 168) that is associated with the clamp axis of rotation. The disc fixing apparatus further comprises a fastener (such as 160) with a registration feature (such as 209) that is cooperable with the reference surface, and the fastener is attachable to the hub, thereby fixing the disc and hub in rotation and registering the clamp to the motor axis of rotation.

The clamp can be adapted for coaxial registration to the longitudinal axis of the fastener and, in turn, adapted for coaxial registration to the motor axis of registration. The reference surface preferably defines an opening receivingly engageable with the registration feature in a closely-fitting relationship such as, but not limited to, a frictional-fitting relationship.

The registration feature can comprise a surface disposed parallel to the fastener longitudinal axis, such as but not limited to a cylindrical registration feature receivingly engageable within a circular reference surface. The reference surface can be arcuate so as to define a point contact with the registration feature. The registration feature can furthermore define an arcuate portion matingly engageable with the arcuate reference surface.

The embodiments of the present invention furthermore contemplate a disc stack assembly (such as 106) comprising the motor and disc fixed in rotation with the disc fixing apparatus. The embodiments of the present invention furthermore contemplate a disc drive (such as 100) comprising the motor and disc and means for fixing the disc in rotation with the hub by registering a longitudinal clamping force and associated rotational inertia with the motor axis of rotation. The embodiments of the present invention furthermore contemplate a method for fixing a disc in balanced rotation with a rotatable hub of a motor around a motor axis of rotation, comprising the steps of providing a clamp member comprising a reference surface associated with a clamp axis of rotation (such as 302–306); registering the clamp member with a longitudinal axis of a fastener (such as 308); aligning the fastener and clamp together with the hub and attaching the fastener to the hub so as to register the clamp member with the motor axis of rotation (such as 310).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the manner of attaching the fastener to the motor hub may vary while maintaining substantially the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, or optical data storage systems, without departing from the scope and spirit of the present invention.

What is claimed is:

1. A disc fixing apparatus for fixing a data storage disc in rotation with a hub of a motor that is rotatable around a motor axis of rotation in a data storage device, the disc fixing apparatus comprising:

a clamp engageable with the hub comprising a reference surface associated with the clamp axis of rotation; and a fastener comprising a registration feature cooperable with the reference surface, the fastener attachable to the motor hub fixing the disc and hub in rotation and registering the clamp to the motor axis of rotation, wherein a clearance gap is located between a portion of the registration feature of the fastener and the hub.

2. The apparatus of claim 1 wherein the clamp is adapted for coaxial registration to the longitudinal axis of the fastener.

3. The apparatus of claim 1 wherein the clamp is adapted for coaxial registration to the motor axis of rotation.

4. The apparatus of claim 1 wherein the reference surface defines an opening receivingly engageable with the registration feature in a closely-fitting relationship.

5. The apparatus of claim 4 wherein the registration feature is engageable in the opening in a frictional-fitting relationship, maintaining the clamp registration with the fastener.

6. The apparatus of claim 4 wherein the registration feature comprises a surface disposed parallel to the fastener longitudinal axis.

7. The apparatus of claim 6 wherein the clamp comprises opposing planar faces with the reference surface connecting the faces, wherein the reference surface is characteristically arcuate and thereby receivingly engageable with the registration feature in a point contact relationship.

8. The apparatus of claim 7 wherein the registration feature terminates in an arcuate surface operably engageable with the reference surface in a mating relationship.

9. The apparatus of claim 4 wherein the opening is circular and the registration feature is cylindrical.

10. The apparatus of claim 9 wherein the clamp comprises a contact surface pressingly engageable against the disc and concentric with the opening.

11. The apparatus of claim 10 wherein the contact surface is annular.

12. The apparatus of claim 1 further comprising an opening defined by the clamp receivingly engageable with a removable locating member passable through the clamp and engageable with the hub to fix the clamp and hub in rotation.

13. The apparatus of claim 1 wherein the clamp defines a relief notch characteristically positioned and sized to operably compensate for rotational imbalance.

14. A disc stack assembly, comprising:
   a motor comprising a hub rotatable around a motor axis of rotation;
   a disc disposed around the hub;
   a disc fixing apparatus, comprising:
   a clamp engaging the hub comprising a reference surface associated with the clamp axis of rotation; and
   a fastener comprising a registration feature cooperating with the reference surface, the fastener attached to the motor hub fixing the disc and hub in rotation and registering the clamp with the motor axis of rotation, wherein a clearance gap is located between a portion of the registration feature of the fastener and the hub.

15. The apparatus of claim 14 wherein the clamp is coaxially registered to the longitudinal axis of the fastener.

16. The apparatus of claim 14 wherein the clamp is coaxially registered to the motor axis of rotation.

17. The disc stack assembly of claim 14 wherein the reference surface defines an opening matingly engaging the registration feature.

18. The disc stack assembly of claim 17 wherein the opening is circular and the registration feature is cylindrical.

19. The disc stack assembly of claim 17 wherein the clamp comprises an annular contact surface pressingly engaging the disc and concentric with the opening.

20. The disc stack assembly of claim 14 wherein the registration feature comprises a surface disposed parallel to the fastener longitudinal axis.

21. The disc stack assembly of claim 14 wherein the clamp defines a relief notch characteristically positioned and sized to compensate for rotational imbalance.

22. A disc drive, comprising:
   a base supporting a motor comprising a hub operably rotatable around a motor axis of rotation and supporting, in turn, a disc disposed around the hub;
   means for fixing the disc in rotation with the hub by registering a longitudinal clamping force and associated rotational inertia with the motor axis of rotation.

23. The disc drive of claim 22 wherein the means for fixing comprises a disc clamp, comprising:
   a clamp comprising a reference surface associated with a clamp axis of rotation; and
   a fastener comprising a registration feature cooperating with the reference surface, the fastener attached to the motor hub fixing the disc and hub in rotation and registering the clamp with the motor axis of rotation.

24. The disc drive of claim 23 wherein the means for fixing is further characterized by a reference surface defining an opening matingly engaging the registration feature.

25. The disc drive of claim 24 wherein the means for fixing is further characterized by a circular opening and a cylindrical registration feature.

26. The disc drive of claim 24 wherein the means for fixing is further characterized by a contact surface of the clamp pressingly engaging the disc and concentric with the opening.

27. The disc drive of claim 23 wherein the means for fixing is further characterized by a registration feature comprising a surface disposed parallel to the fastener longitudinal axis.

* * * * *